(12) United States Patent
Holz et al.

(10) Patent No.: US 9,510,510 B2
(45) Date of Patent: Dec. 6, 2016

(54) MATERIAL COLLECTION SYSTEM SENSOR

(71) Applicant: Deere & Company, Moline, IL (US)

(72) Inventors: William J Holz, Hartford, WI (US); Patrick J Shaver, Eden Prairie, MN (US); Christopher A Krajnik, Eden Prairie, MN (US)

(73) Assignee: DEERE & COMPANY, Moline, IL (US)

( * ) Notice: Subject to any disclaimer, the term of this patent is extended or adjusted under 35 U.S.C. 154(b) by 613 days.

(21) Appl. No.: 13/934,422

(22) Filed: Jul. 3, 2013

(65) Prior Publication Data
US 2015/0007546 A1    Jan. 8, 2015

(51) Int. Cl.
*A01D 46/06* (2006.01)
*A01D 43/063* (2006.01)

(52) U.S. Cl.
CPC .................. *A01D 43/0631* (2013.01)

(58) Field of Classification Search
CPC .................................................. A01D 43/063
USPC .......................... 56/10.2 R, 16.6, 202, 203
See application file for complete search history.

(56) References Cited

U.S. PATENT DOCUMENTS

| 4,782,650 A | 11/1988 | Walker |
| 4,835,951 A | 6/1989 | Walker |
| 4,964,266 A | 10/1990 | Kolb |
| 4,969,320 A | 11/1990 | Langford |
| 4,981,011 A | 1/1991 | Olejak |
| 5,321,939 A | 6/1994 | Fuse et al. |
| 5,388,394 A | 2/1995 | Heismann |
| 5,605,033 A | 2/1997 | Olmr |
| 5,775,077 A | 7/1998 | Olmr |
| 5,832,708 A | 11/1998 | Sugden |
| 5,950,408 A | 9/1999 | Schaedler |
| 5,960,613 A | 10/1999 | Mixon et al. |
| 6,038,843 A | 3/2000 | Sebben et al. |
| 6,073,432 A | 6/2000 | Schaedler |
| 6,272,818 B1 | 8/2001 | Sebben et al. |
| 6,622,465 B2 | 9/2003 | Jerome et al. |
| 7,448,192 B2 | 11/2008 | Umemoto et al. |
| 8,006,473 B2 | 8/2011 | Kuramoto et al. |
| 2009/0320433 A1* | 12/2009 | Kuramoto et al. ............. 56/202 |

FOREIGN PATENT DOCUMENTS

EP    2020173 A1    4/2009

* cited by examiner

*Primary Examiner* — Robert Pezzuto
*Assistant Examiner* — Mai Nguyen

(57) ABSTRACT

A material collection system sensor includes a paddle pivotably mounted to a tunnel on a collection container floor. The forward end of the paddle is adjacent a front of the collection container and the rearward end is adjacent a rear of the collection container. A switch mounted to the tunnel under the paddle has an actuator extending above the tunnel that is actuatable by downward pivotal movement of the paddle. A sensitivity adjuster attached to the tunnel under the paddle has a sensitivity adjustment knob outside the collection container which compresses or relaxes a spring extending upwardly against the paddle.

6 Claims, 6 Drawing Sheets

MATERIAL COLLECTION SYSTEM SENSOR

FIELD OF THE INVENTION

This invention relates generally to grass mowing machines, and more specifically to material collection system sensors.

BACKGROUND OF THE INVENTION

Grass mowing machines may include material collection system sensors that are intended to sense if the collection container is full. For example, some material collection systems include sensors that detect air pressure in the discharge chute as shown in U.S. Pat. Nos. 5,388,394, 5,605,033, 5,775,077, 5,950,408, 6,073,432 and 6,622,465. These sensors are not easily adjustable to compensate for differences in material flow of wet grass clippings and dry grass clippings through the discharge chute into the collection container.

Other material collection system sensors include pivotable devices that contact grass clippings in the container as shown in U.S. Pat. Nos. 4,969,320 and 6,272,818; electrical conductivity sensors as shown in U.S. Pat. Nos. 4,964,266 and 5,960,613 and European Patent Application EP2020173A1; sensors that detect resistance to oscillation as shown in U.S. Pat. No. 5,832,708; light sensors as shown in U.S. Pat. No. 5,321,939; and weight sensors as shown in U.S. Pat. No. 4,981,011. These sensors also are not repeatable for wet grass clippings and dry grass clippings, or difficult to adjust for sensitivity to moisture and weight of collected material.

There is a need for a material collection system sensor that can be easily adjusted for moisture and weight of wet grass clippings and dry grass clippings. There is a need for a material collection system sensor that can help maximize the amount of material collected in the container, without the discharge chute becoming plugged with grass clippings. There is a need for a material collection system sensor that can be used on a rear discharge rear collection mower.

SUMMARY OF THE INVENTION

The material collection system sensor includes a paddle mounted in a collection container. The paddle has a forward end and a rearward end, with the rearward end pivotably mounted to a tunnel in the collection container. A spring extending through a recess under the tunnel biases the forward end of the paddle upwardly. A switch under the paddle turns on a fullness warning indicator if the paddle pivots sufficiently downwardly toward the tunnel to actuate the switch. A sensitivity adjuster under the tunnel increases or decreases the spring force by moving the spring toward or away from the paddle and has an adjustment knob outside the collection container.

The material collection system sensor can be easily adjusted for moisture and weight of wet grass clippings and dry grass clippings. The material collection system sensor can help maximize the amount of material collected in the container, without the discharge chute becoming plugged with grass clippings, and can be used on a rear discharge rear collection mower

DESCRIPTION OF THE PREFERRED EMBODIMENT

Figure 1:
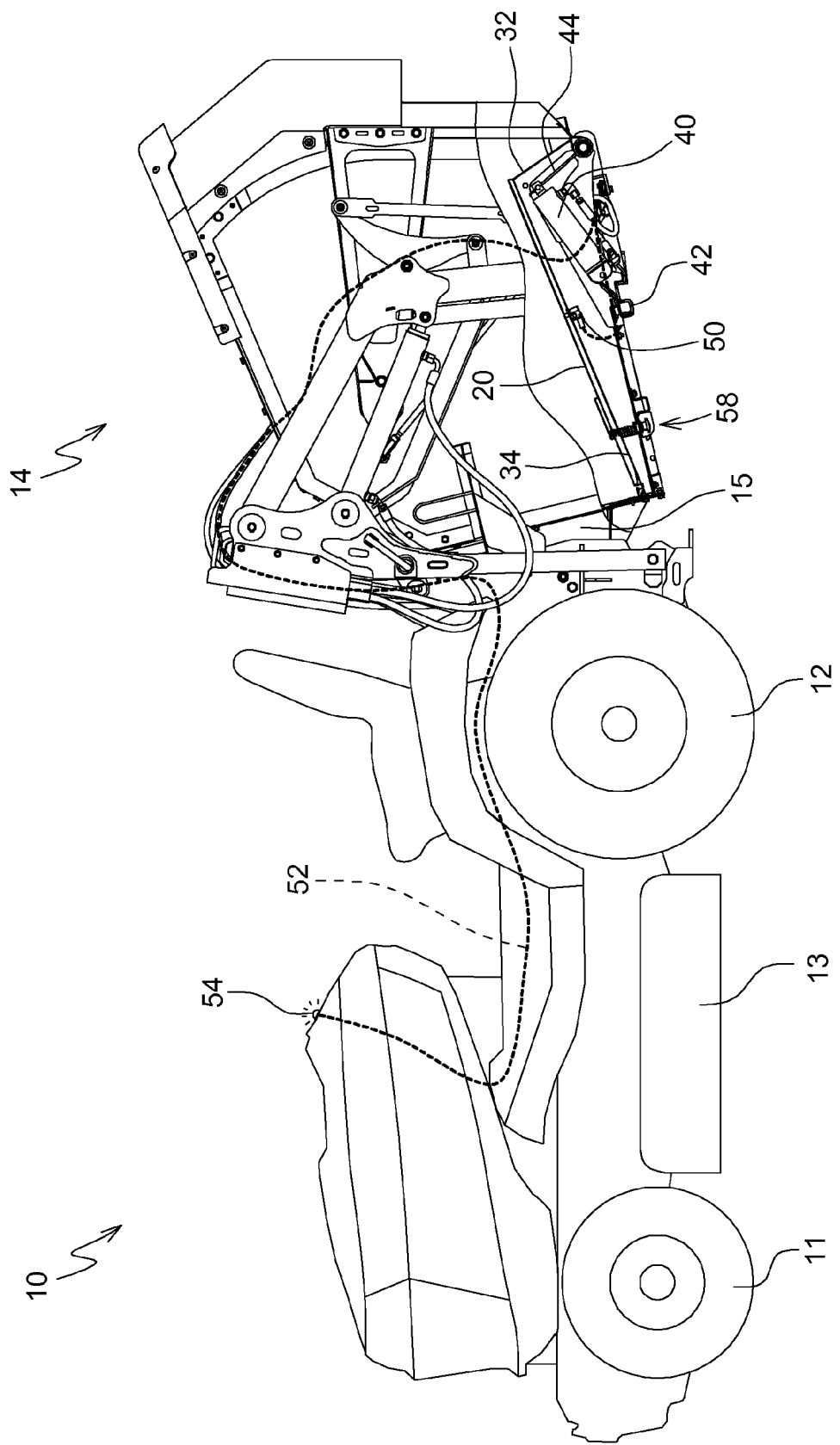
FIG. 1 is a side view of a lawn and garden tractor with the material collection system sensor according to a first embodiment of the invention, with the collection container in the collection position.
Figure 2:
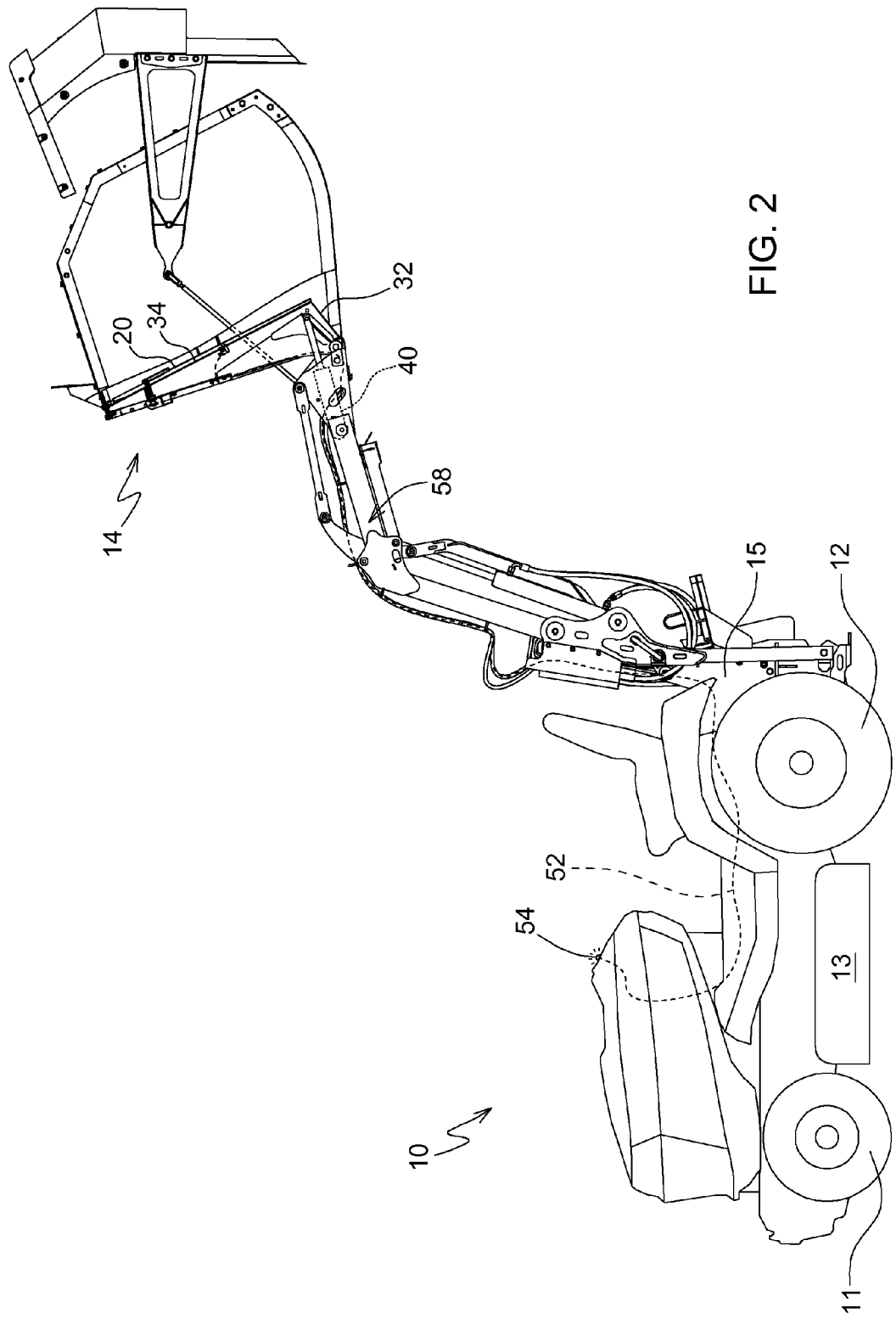
FIG. 2 is a side view of a lawn and garden tractor with the material collection system sensor according to a first embodiment of the invention, with the collection container in the raised and dump position.
Figure 3:
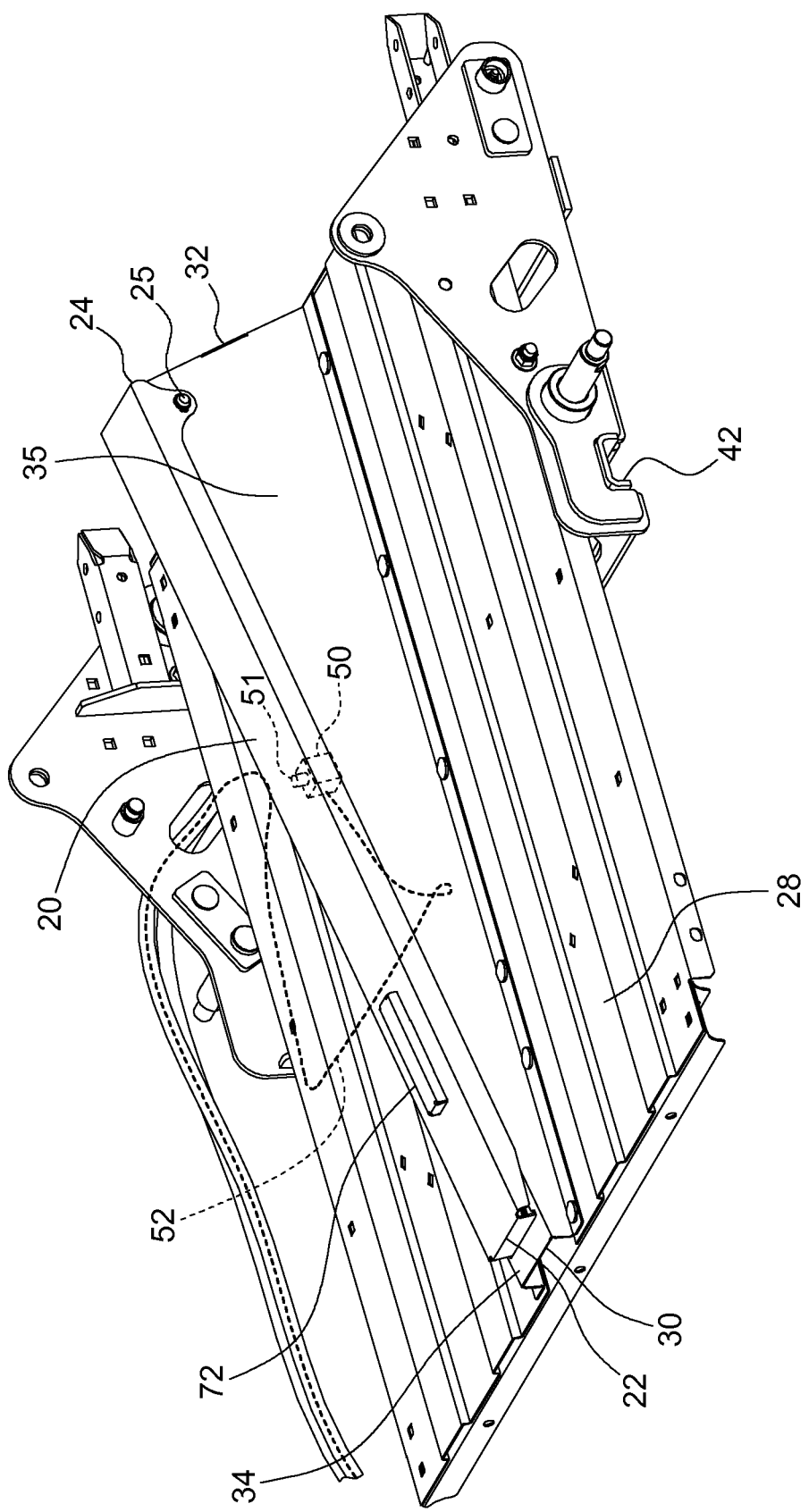
FIG. 3 is a perspective view of the material collection system sensor according to a preferred embodiment of the invention, with the switch not actuated.
Figure 4:
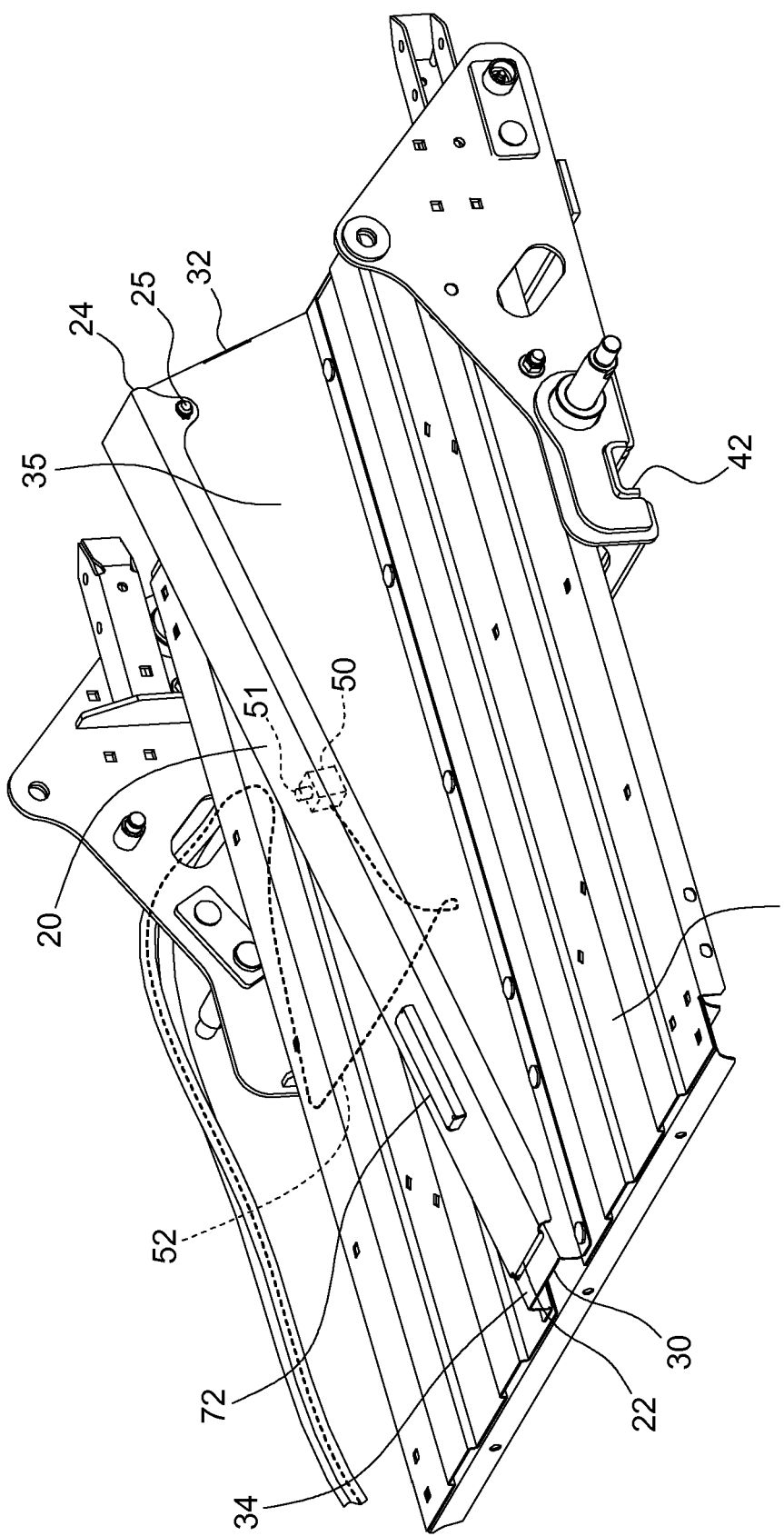
FIG. 4 is a perspective view of the material collection system sensor according to a preferred embodiment of the invention, with the switch actuated.

In one embodiment shown in FIGS. 1-6, lawn and garden tractor 10 may have front wheels 11, rear wheels 12, mower deck 13 suspended from the vehicle frame between the front and rear wheels, and grass collection container 14 mounted at the rear of the vehicle. At least one surface, or a portion of one or more surfaces, of collection container 14 may be an air permeable material, such as a mesh or screen. Mower deck 13 may cover one or more cutting blades to cut and propel grass clippings into a material collection system. The material collection system may include discharge chute 15 extending rearwardly between an opening in mower deck 13 and grass collection container 14. Optionally, the material collection system may include an auxiliary blower or fan which may be mounted in a housing adjacent discharge chute 15 to help propel grass clippings through the duct into grass collection container 14.

In one embodiment, material collection system may have a rear discharge, rear collect configuration. For example, the mower deck may have two counter rotating cutting blades which force the grass clippings through a discharge chute located under the operator's seat. The grass clippings may exit the discharge chute and enter the collection container that the operator may tip and dump from a seated position. However, the material collection system sensor also may be used on lawn and garden tractors having decks with three or more cutting blades. Additionally, the material collection system sensor may be used on other types of grass mowing machines including but not limited to zero turning radius mowers.

In one embodiment shown in FIGS. 1-6, the material collection system sensor may include paddle 20 which may be a sheet metal or plastic member having a first or forward end 22 and a second or rearward end 24. The paddle may have a width of between about 10 mm and about 50 mm, and a length of between about 200 mm and about 600 mm. The rearward end of the paddle may be pivotably mounted to tunnel 35 with pin 25, so that the forward end of the paddle may have a maximum displacement (upwardly and downwardly) of at least about 10 mm and less than about 50 mm.

In one embodiment, the material collection system sensor may include tunnel 35 which may be a sheet metal or plastic member mounted to the inside floor 28 of the collection container, preferably near the middle between the left and right sides of the collection container. The tunnel may provide an inclined surface above the generally flat and substantially planar inside floor surface of the collection container. The tunnel may have width and length dimensions substantially corresponding to the paddle width and length dimensions. The first or forward end 30 of the tunnel may be positioned on the inside floor adjacent the front of the collection container, and the second or rearward end 32 may be on the inside floor adjacent the rear or back of the collection container. The top surface 34 of the tunnel may be inclined or sloped upwardly from the forward end to the rearward end, and the underside of the tunnel may provide an open or hollow recess.

Figure 5:
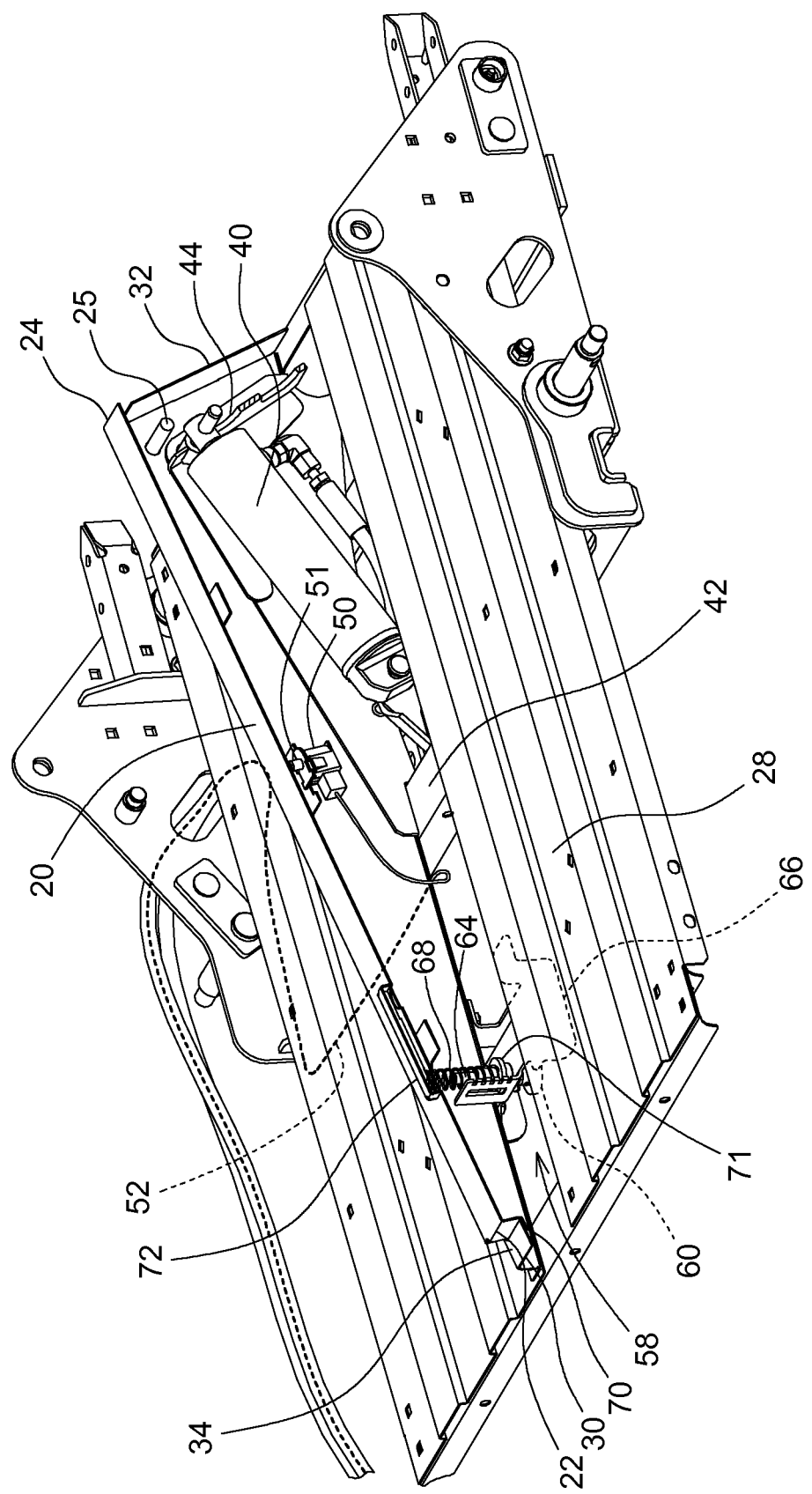
FIG. 5 is a perspective view, partially in section, of the material collection system sensor according to a preferred embodiment of the invention, with the switch not actuated.
Figure 6:
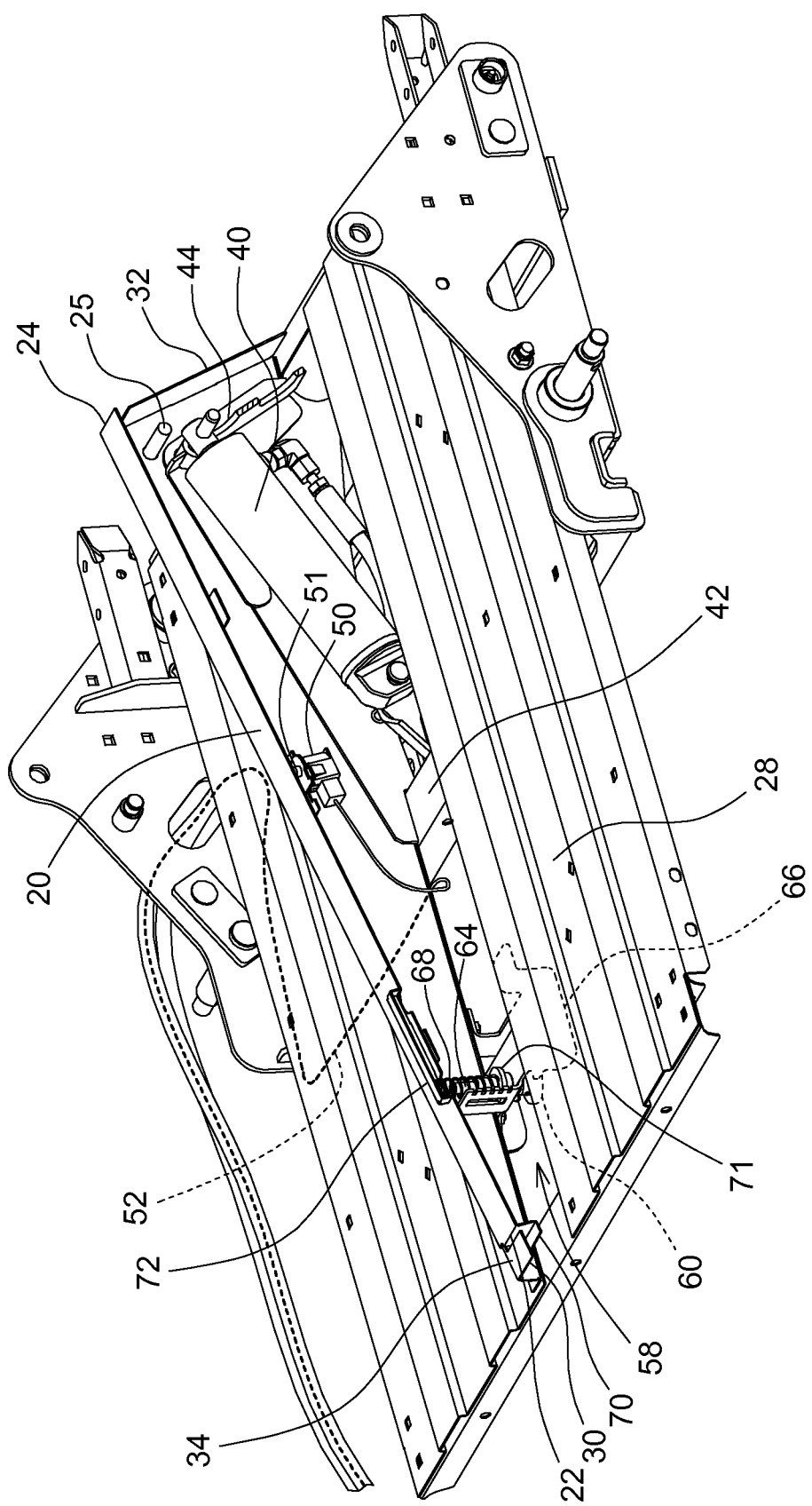
FIG. 6 is a perspective view, partially in section, of the material collection system sensor according to a preferred embodiment of the invention, with the switch actuated

In one embodiment, as shown in FIGS. 5-6, hydraulic dump cylinder 40 may be positioned in the recess within the underside of the tunnel when the collection container is in the lowered or collection position. A forward end of the dump cylinder may be connected to frame assembly 42 attached to the rear of the lawn and garden tractor. A rearward end of the dump cylinder may be connected to rear support member 44 of the collection container near the rearward end of the tunnel. More specifically, the second end of the dump cylinder may be connected to a cross member of frame assembly 42, under the floor of the collection container. The dump cylinder may extend to dump the collection container when it is in a raised position.

In one embodiment, the material collection system sensor may include switch 50. The switch body may be snap mounted to the tunnel below the top surface of the tunnel, and the switch may include button or actuator 51 projecting above the top surface of the tunnel where it may be contacted by paddle 20. The paddle may contact and actuate the switch when the collection container fills with material. The switch may have a push button or plunger type switch actuator that may be spring biased to a normally open position and that requires motion of about 0.040 to about 0.150 inches to make or break contacts. An example of a switch is shown in U.S. Pat. No. 4,812,604. The switch may be connected by wiring harness 52 to visible or audible fullness indicator 54 in the operator station of the lawn and garden tractor.

In one embodiment, grass clippings or other material may accumulate on paddle 20 to move the paddle downwardly sufficiently to actuate the switch. The displacement to actuate the switch may be at least about 5 mm and less than about 25 mm. This may be the required paddle displacement near the middle of the tunnel where the switch is positioned. The switch may be located in a fore and aft position near the middle of the tunnel between the tunnel's forward and rearward ends. Top surface 34 of the tunnel may provide a stop which limits downward displacement of the paddle. Lip 70 on the forward end of the paddle may provide a stop that limits upward displacement of the paddle, because lip abuts forward end 30 of the tunnel.

In one embodiment, the material collection system sensor may include sensitivity adjuster 58 attached by snap mounting to the underside of tunnel 35 and under the paddle near the paddle's forward end. The sensitivity adjuster may include sensitivity adjustment knob 60 which may be rotatably mounted with bracket 66 to the outer bottom surface of the collection container. For example, the sensitivity adjustment knob may be attached to the lower end of captive screw 64 extending through openings in tunnel 35 and the bottom surface of the collection container. When the collection container is in the lowered or collection position, the operator may reach under the collection container to change the sensitivity setting using the sensitivity adjustment knob. When lift cylinder 40 is used to raise the collection container to the dump position, the operator may reach and change the setting of the sensitivity adjustment knob. Bracket 66 also may include a guard extending from the bottom of the collection container that provides a protective structure adjacent the sensitivity adjustment knob.

In one embodiment, sensitivity adjuster 58 may include spring 68 which may be seated on bushing 71 that rides on captive screw 64 in the recess under the tunnel. The spring may extend upwardly through the recess under the tunnel to contact and/or engage slot 72 on the paddle surface adjacent the paddle's forward end. The spring may urge or bias the forward end of the paddle upwardly. The operator may turn sensitivity adjustment knob 60 to rotate captive screw 64 and raise bushing 71 up and toward the paddle and compress the spring, or down and away from the paddle to relax the spring. As a result, the sensitivity adjustment knob may be used to change the spring force and thus the sensitivity of the material collection system sensor.

In one embodiment, the operator may turn sensitivity adjustment knob 60 in a direction to compress the spring and lower the sensitivity of the fill sensor so that more material, or material with an increased density such as wet grass clippings, may be required in the collection container to displace the paddle sufficiently to actuate the switch. The operator may turn sensitivity adjustment knob 60 in the other direction to relax the spring and increase the sensitivity of the fill sensor so that less material, or material with a lower density such as dry grass clippings, is required in the collection container to displace the paddle sufficiently to actuate the switch.

Having described the preferred embodiment, it will become apparent that various modifications can be made without departing from the scope of the invention as defined in the accompanying claims.

The invention claimed is:

1. A material collection system sensor, comprising:
   a paddle pivotably mounted within a collection container to a tunnel having a top surface inclining upwardly from a forward end to a rearward end above a collection container floor;
   a switch mounted to the tunnel below the inclined top surface of the tunnel under the paddle and having an actuator extending above the top surface of the tunnel that is actuatable by downward pivotal movement of the paddle; and
   a sensitivity adjuster attached to the tunnel under the paddle and having a sensitivity adjustment knob outside of the collection container which compresses or relaxes a spring extending upwardly against the paddle.

2. The material collection system sensor of claim 1, further comprising a hydraulic dump cylinder positioned in a recess under the tunnel.

3. The material collection system sensor of claim 1, wherein the top surface of the tunnel provides a stop limiting downward pivotal movement of the paddle at a full condition.

4. A material collection system sensor, comprising:
   a paddle mounted in a collection container and having a forward end and a rearward end; the rearward end pivotably mounted to a tunnel that slopes upwardly above a floor of the collection container;
   a spring extending through a recess under the tunnel and biasing the forward end of the paddle upwardly;
   a switch under the paddle that turns on a fullness warning indicator if the paddle pivots sufficiently downwardly toward the tunnel to actuate the switch; and
   a sensitivity adjuster under the tunnel which changes the spring force acting on the paddle and having a knob under the collection container floor.

5. The material collection system sensor of claim 4 wherein the tunnel is positioned near a middle of a floor of the collection container between a left side and a right side of the collection container.

6. A material collection system sensor, comprising:
- a moveable paddle mounted to an inclined tunnel above a floor of a collection container and having an upwardly biased forward end near a front of the collection container, and a pivotably mounted rearward end near a rear of the collection container;
- a push button switch in a recess of the tunnel under the paddle that is actuated by downward movement of the paddle; and
- a sensitivity adjuster extending through the tunnel below the floor to adjust the upward bias of the forward end of the paddle.

\* \* \* \* \*